United States Patent
Marion

(10) Patent No.: US 7,204,377 B2
(45) Date of Patent: Apr. 17, 2007

(54) LATCH SYSTEM

(75) Inventor: Randall L Marion, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/998,348

(22) Filed: Nov. 24, 2004

(65) Prior Publication Data

US 2006/0108308 A1    May 25, 2006

(51) Int. Cl.
*A47B 47/00* (2006.01)

(52) U.S. Cl. .................. 211/194; 211/188; 211/183

(58) Field of Classification Search .......... 211/194, 211/192, 188, 126.12, 182, 201, 183; 403/321, 403/410, 325, 315, 316, 335, 363, 380, 364, 403/345, 331, 339; 248/500, 507, 508
See application file for complete search history.

(56) References Cited

U.S. PATENT DOCUMENTS

| | | | | |
|---|---|---|---|---|
| 3,606,023 A * | 9/1971 | Edmunds | ................ | 211/74 |
| 4,187,786 A * | 2/1980 | Feig et al. | ................ | 108/64 |
| 4,586,619 A * | 5/1986 | Eckert | ................ | 211/189 |
| 4,998,023 A * | 3/1991 | Kitts | ................ | 280/47.35 |
| 5,188,749 A * | 2/1993 | Crooker | ................ | 252/67 |
| 5,492,399 A * | 2/1996 | Tillack | ................ | 312/111 |
| 5,832,689 A * | 11/1998 | Curll | ................ | 52/656.9 |
| 6,321,918 B1* | 11/2001 | Rollins | ................ | 211/40 |
| 6,520,356 B2* | 2/2003 | Miller, Jr. | ................ | 211/188 |
| 6,527,473 B2* | 3/2003 | Chen | ................ | 403/374.1 |
| 6,675,979 B2* | 1/2004 | Taylor | ................ | 211/186 |
| 6,796,565 B2* | 9/2004 | Choi et al. | ................ | 280/47.35 |
| 2002/0117463 A1* | 8/2002 | Daniel et al. | ................ | 211/189 |
| 2003/0066813 A1* | 4/2003 | Taylor | ................ | 211/186 |
| 2004/0238469 A1* | 12/2004 | Ng | ................ | 211/149 |

* cited by examiner

*Primary Examiner*—Jennifer E. Novosad
(74) *Attorney, Agent, or Firm*—Harness, Dickey & Pierce, P.L.C.

(57) ABSTRACT

A connection system for a modular structure is provided. The connection system includes a plurality of connector assemblies that connect a first structure module to a second structure module. The connection system additionally includes at least one retaining pin. The retaining pin is used to maintain a respective connector assembly in a locked state, thereby connecting the first and second structure modules in a steadfast manner. Each connector assembly includes a first catch affixed to a first member of the first structure module and a second catch affixed to a first member of the second structure module. The first and second catches are formed to interlock under linear movement of the first structure module relative to the second structure module. To maintain the first and second catches in the interlocked state, the retaining pin is positioned into a space between the first catch of the respective connector assembly and a second member of the second structure module when the first catches interlock with the second catches.

8 Claims, 3 Drawing Sheets

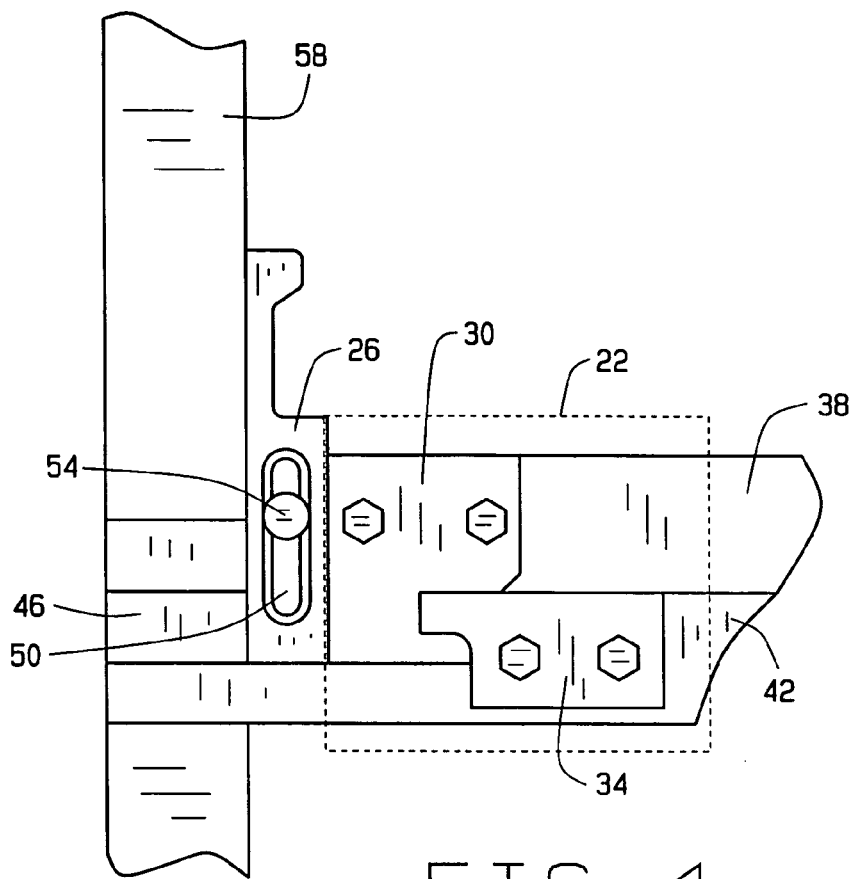

FIG. 4

| 102 | THE FIRST AND SECOND MODULES ARE PLACED ADJACENT EACH OTHER SUCH THAT THE FIRST MEMBER(S) OF THE FIRST MODULE IS/ARE ALIGNED WITH, ADJACENT TO AND ESSENTIALLY IN CONTACT WITH THE FIRST MEMBER(S) OF THE SECOND MODULE. |
|---|---|
| 104 | EITHER THE FIRST MODULE OR THE SECOND MODULE IS THEN MOVED, RELATIVE TO THE OTHER MODULE, ALONG A LONGITUDINAL LINE PARALLEL WITH THE FIRST STRUCTURAL MEMBERS OF THE FIRST AND SECOND MODULES. |
| 106 | ONCE THE FIRST CATCHES ARE INTERLOCKED WITH THE SECOND CATCHES, THE RETAINING PIN IS POSITIONED BETWEEN THE FIRST CATCH OF THE LOCKING CONNECTOR ASSEMBLY AND THE SECOND STRUCTURAL MEMBER OF THE SECOND MODULE TO RETAIN THE CONNECTOR ASSEMBLIES IN THE INTERLOCKED POSITION |

FIG. 5

LATCH SYSTEM

FIELD OF INVENTION

The invention relates generally to the assembly of rack assemblies and more particularly to a connection system to securely connect various components of the rack assembly in an expeditious and efficient manner.

BACKGROUND OF THE INVENTION

Modular structures, such as automated test equipment racks, include a plurality of modules that can be transported from one location to another and then assembled to make the resulting structure. Typically, to assemble such modular structures, the various modules are stacked on top of each other and/or adjacent each other then connected, latched, coupled or joined together to create a tower or multiple connected towers. The structures can then be disassembled when needed and reassembled at a different location. The mechanisms, assemblies or devices used to connect and disconnect the individual modules are often expensive and unreliable, and/or cumbersome, time consuming and difficult to operate.

Therefore, it is desirable to have a cost effective connection system that will allow the various modules of modular structures to attach to each other readily and reliably and that can be disassembled just as easily.

BRIEF SUMMARY OF THE INVENTION

A connection system for a modular structure, for example a modular rack system, is provided in accordance with a preferred embodiment of the present invention. The connection system includes a plurality of connector assemblies that connect a first structure module to a second structure module. The connection system additionally includes at least one retaining pin. The retaining pin is used to maintain a respective connector assembly in a locked state, thereby connecting the first and second structure modules in a steadfast manner. Each connector assembly includes a first catch affixed to a first member of the first structure module and a second catch affixed to a first member of the second structure module. The first and second catches are formed to interlock under linear movement of the first structure module relative to the second structure module. To interlock the first and second catches the first and second structure modules are placed adjacent each other so that the first members of the first and second modules are adjacent, coplanar and parallel. The first, second or both structure modules are then moved relative to each other along a longitudinal line that is parallel to the first members.

The retaining pin is slidably connected to a second member of the first structure module and adapted to be positioned into a space between the first catch of the respective connector assembly and a second member of the second structure module when the first catches interlock with the second catches. In a preferred embodiment, the first catches are affixed to an inner side of the first member of the first structure module and extend adjacent to an inner side of the first member of the second structure module. Therefore, the first structure module can not move other than along the longitudinal line due to interference between the first catches and the first member of the second structure module. Alternatively, the second catches are affixed to an inner side of the first member of the second structure module and extend adjacent to an inner side of the first member of the first structure module. Thus, the second structure module can not move other than along the longitudinal line due to interference between the second catches and the first member of the first structure module.

The features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein;

FIG. 4 is a schematic of a locking connector assembly of a connection system shown in FIG. 1, in accordance with an alternate preferred embodiment of the present invention; and FIG. 5 is a flow chart illustrating a method of connecting a plurality of modules to form the module structure shown in FIG. 1.

Corresponding reference numerals indicate corresponding parts throughout the several views of drawings.

DETAILED DESCRIPTION OF THE INVENTION

The following description of the preferred embodiments is merely exemplary in nature and is in no way intended to limit the invention, its application or uses. Additionally, the advantages provided by the preferred embodiments, as described below, are exemplary in nature and not all preferred embodiments provide the same advantages or the same degree of advantages.

Figure 1:
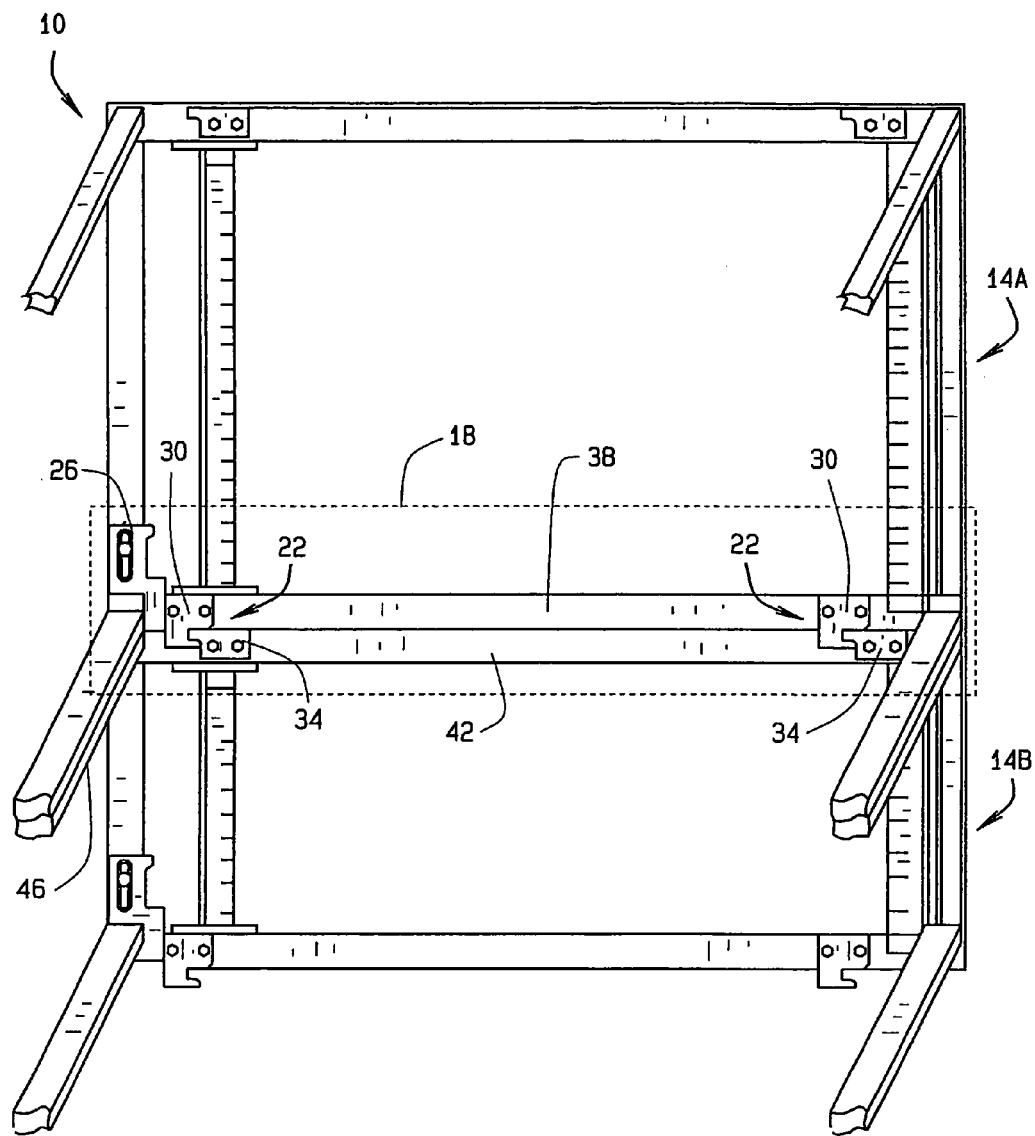
FIG. 1 is a sectional isometric view of a modular structure having a plurality of modules connected together using a connection system in accordance with a preferred embodiment of the present invention.

FIG. 1 is a sectional isometric view of a modular structure 10 including a plurality of modules 14 connected together using a connection system 18, in accordance with a preferred embodiment of the present invention. The connection system 18 allows the modules 14 to attach to each other securely, readily and reliably in a manner that also allows the resulting structure to be disassembled just as easily. Although the modular structure is shown in FIG. 1 as a rack system, such as an automated test equipment rack, it should be understood that the connection system 18 is applicable to any structure assembled by connecting a plurality of modules 14. Additionally, although the modules 14 of the structure 10 shown in FIG. 1 are shown as a framework or rack modules, it should be understood that the modules 14 could have any form suitable for implementation of the connection system 18, as described herein. For example, the modules 14 can comprise framework modules with panels attached to the framework, molded components, e.g. panels, joined to form the various modules and properly cast to allow attachment of the connection system 18 or molded modules properly cast to allow attachment of the connection system 18. Furthermore, although FIG. 1 illustrates two modules 14, shown as first module 14A and second module 14B, it should be understood that the connection system 18 can be utilized to connect any number of modules 14, as described in detail below.

Figure 2:
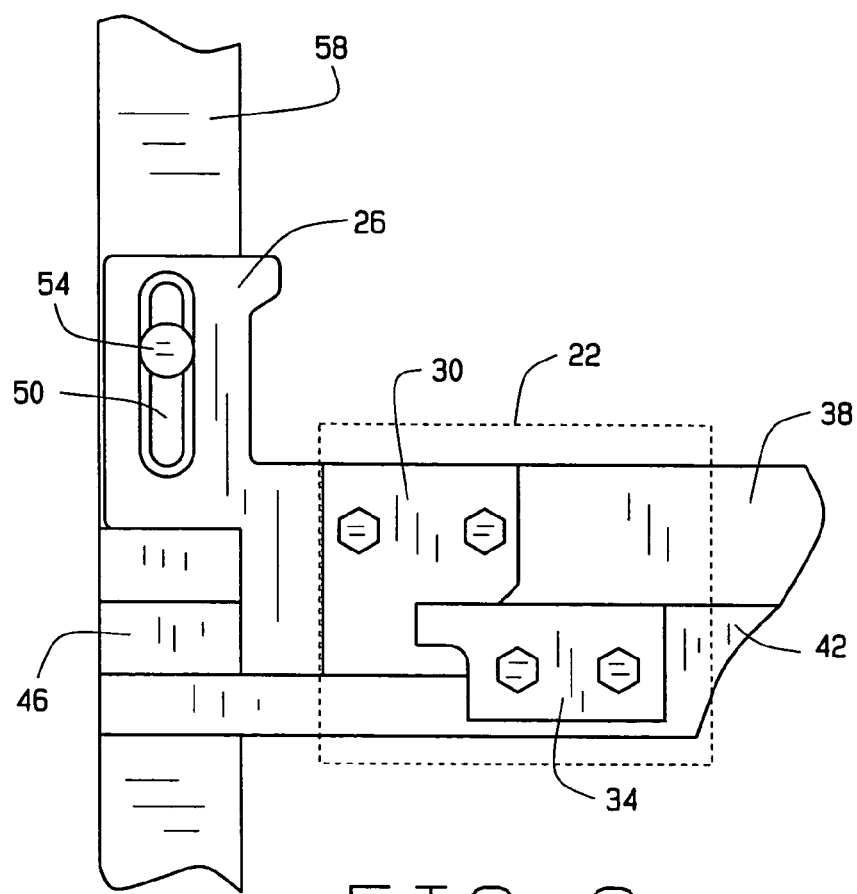
FIG. 2 is a schematic of a locking connector assembly of a connection system shown in FIG. 1, in accordance with a preferred embodiment of the present invention.
Figure 3:
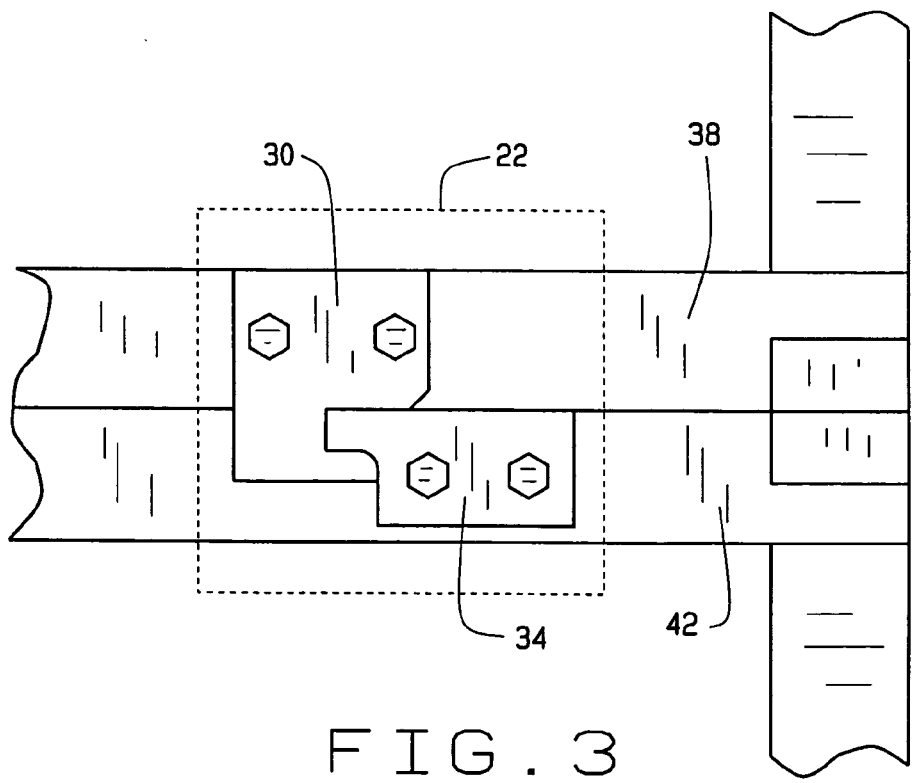
FIG. 3 is a schematic of a non-locking connector assembly of the connection system shown in FIG. 1.

Referring to FIGS. 1, 2 and 3, the connection system 18 includes a plurality of connector assemblies 22, best shown in FIGS. 2 and 3, and a retaining pin 26. The exemplary embodiment shown in FIG. 1 includes two connector assemblies 22; however, the invention is not so limited. Each connector assembly includes a first catch 30 and a second catch 34 that mate together in an interlocking manner. The mating catches 30 and 34, also referred to herein as brackets, can mate in any suitable interlocking fashion and are not restricted to have the exemplary 'male/female' interlocking form shown in FIGS. 1, 2 and 3. For example, the first catch 30 could have a lip along an edge and the second catch could have a similar lip along an edge such that the lips overlap to interlock the catches 30 and 34. Furthermore, although FIGS. 1, 2 and 3 illustrate the catches 30 and 34 having an over and under, or upper and lower, relationship when interlocked, it should be understood that catches 30 and 34 could have a side-by-side relationship when interlocked. Therefore, the connection system 18 is applicable for connecting the modules 14 stacked on top of each other, aligned side-by-side or in any other orientation.

Each first catch 30 is attached to a first member 38 of the first module 14A and the second catch 34 is connected to a first member 42 of the second module 14B. The first and second catches 30 and 34 can be attached to the respective first members 38 and 42 using any suitable connecting means. For example, first and second catches 30 and 34 can be riveted, soldered, glued, screwed, bolted or spot welded to the respective first members 38 and 42. The first members 38 and 42 are support structures along an edge of respective modules 14 that will be aligned, i.e. parallel and coplanar, and adjacent each other when the modules 14 are placed together. For example, if the modules 14 comprise joined molded panels, the first members 38 and 42 could be supportive splines along the respective edges, or if the modules are rack frames, the first members 38 and 42 could be struts or supports that form the frames. The first and second catches 30 and 34 mate in the interlocking fashion by placing the first module 14A adjacent the second module 14B such that the first members 38 and 42 are positioned adjacent in a longitudinally aligned, coplanar orientation. Then by moving either the first module 14A and/or the second module 14B relative to each other along a longitudinal line parallel with the first members 38 and 42, the first catches 30 interlock with the second catches 34.

To retain the connector assemblies 22, i.e. the first and second catches 30 and 34, in the interlocked state, the retaining pin 26 is positioned in a space between the first catch 30 of one of the connector assemblies 22 and a second member 46 of the second module 14B. Preferably, the retaining pin 26 fills the entire space between the first catch 30 of one of the connector assemblies 22 and a second member 46 of the second module 14B. Accordingly, the connector assemblies 22 that cooperate with a retaining pin 26 are also referred to herein as locking connector assemblies 22 while the other connector assemblies that do not cooperate with a retaining pin are sometimes referred to herein as non-locking connector assemblies 22. Similar to the first member 42, described above, the second member 46 is support structure along another edge of respective second modules 14B that is generally at a right angle to the first member 42. For example, the second member 46 could be supportive splines in a molded panel or a strut of a rack frame. In a preferred embodiment, the retaining pin 26 includes a recessed slotted aperture 50 through which a shoulder bolt 54 is inserted and threaded into a second member 58 of the first module 14A. Therefore, the retaining pin 26 can be easily slidably inserted into and removed from the space between the first catch 30 and the second member 46 of the second module 14B. If the first and second modules 14A and 14B are assembled in a vertical manner, the retaining pin is slidably coupled to the second member 58 of the first module 14B such that when the first and second catches 30 and 34 are fully engaged and interlocked, the retaining pin drops into the space via gravity. In an alternative preferred embodiment, the retaining pin 26 is slidably coupled to the first member 38 of the first module 14A, as shown in FIG. 4.

Referring to FIG. 1, the illustration shown in FIG. 1 is a sectional view of an exemplary modular structure 10. Therefore, it should be understood that in one preferred embodiment, the modular structure 10 includes another portion, not shown, that is effectively a mirror image of the portion shown and includes another connection system 18. In which case, the two connections systems 18 would form a bilateral connection system that includes two of the locking connector assemblies 22 and two of the non-locking connector assemblies 22. Alternatively, the bilateral connection system could include a single locking connector assembly 22 and at least two non-locking connector assemblies 22, or at least two locking connector assemblies 22 and at least one non-locking connector assembly 22.

As shown in FIG. 1, the connection system 18 is affixed to the first and second modules 14A and 14B along an inner side of the first members 38 and 42. In a preferred embodiment, the first catches 30 extend past an edge of the first member 38 of the first module 14A so that a portion of the first catches 30 will be adjacent the first member 42 of the second module 14B. Thus, when the first and second modules are positioned adjacent each other, e.g. stacked or side-by-side, the portion of the first catches 30 extending adjacent the first member 42 of the second module 14B prevents the first and second modules 14A and 14B from moving, with respect to each other, in any direction other than along the longitudinal line parallel with the first members 38 and 42. In an alternative preferred embodiment, the second catches 34 extend past an edge of the first member 42 of the second module 14B so that a portion of the second catches 34 will be adjacent the first member 38 of the first module 14A. Thus, when the first and second modules are positioned adjacent each other, e.g. stacked or side-by-side, the portion of the second catches 34 extending adjacent the first member 38 of the first module 14A prevents the first and second modules 14A and 14B from moving, with respect to each other, in any direction other than along the longitudinal line parallel with the first members 38 and 42.

FIG. 5 is a flow chart 100 illustrating a method of connecting a plurality of the modules 14 to form the module structure 10, shown in FIG. 1. Initially, the first and second modules 14A and 14B are placed adjacent each other, i.e. stacked or side-by-side, such that the first member(s) 38 of the first module 14A is/are aligned with, adjacent to and essentially in contact with the first member(s) 42 of the second module 14B, as indicated at 102. This positions the first and second catches 30 and 34 of the locking connector assemblies 22 adjacent each other in a non-interlocked relation. Similarly, the first and second catches 30 and 34 of the non-locking connector assemblies 22 are thereby positioned adjacent each other in a non-interlocked relation. Either the first module 14A or the second module 14B is then moved relative to the other module along a longitudinal line parallel with the first structural members 38 and 42 of the first and second modules 14A and 14B, as indicated at 104. This movement causes the first catches 30 to interlock with the second catches 34.

Once the first catches 30 are interlocked with the second catches 34, the retaining pin 26 is positioned in a space between the first catch 30 of the locking connector assembly 22 and the second structural member 46 of the second module 14B, as indicated at 106. The retaining pin 26, therefore, retains the first catches 30 interlocked with the second catches 34 until the retaining pin 26 is withdrawn from the space between the first catch 30 of the locking connector assembly 22 and the second structural member 46 of the second module 14B. In one preferred embodiment, gravity causes the retaining pin 26 to drop between the first catch 30 of the locking connector assembly 22 and the second structural member 46 of the second module 14B.

Thus, the first catches 30 interlock with the second catches 34 by moving the first module 14A in a longitudinal direction and the retaining pin locks the first and second catches in the interlocked state, thereby providing a cost effective connection system that allows the modules 14 to attach to each other readily and reliably.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A modular rack system, said system comprising:
   a first rack module and a second rack module;
   at least one locking connector assembly comprising a first locking connector bracket coupled to the first rack module and a second locking connector bracket coupled to the second rack module and interlockingly mateable with the first locking connector bracket; and
   a locking pin slidably connected to the first rack module and adapted to retain the first locking connector bracket in an interlocking engaged position with the second locking connector bracket such that the first rack module is coupled to the second rack module.

2. The modular rack system of claim 1, wherein the first locking connector bracket is coupled to a coupling strut of the first rack module and the second locking connector bracket is coupled to a coupling strut of the second rack module, the first and second locking connector brackets configured to interlockingly engage when the first module and the second module coupling struts are placed adjacent each other and the first rack module is moved relative to the second rack module along a longitudinal line parallel to the coupling struts.

3. The system of claim 2, wherein the locking pin is configured to be positioned between the first locking connector bracket and a retaining strut orthogonally connected to the coupling strut of the second rack module when the first locking connector bracket interlockingly engages the second locking connector bracket to thereby retain the first and second locking connector brackets in the interlocking engaged position.

4. The system of claim 2, wherein the locking pin is configured to slide between the first locking connector bracket and a retaining strut orthogonally connected to the coupling strut of the second rack module, via gravity and absent manual manipulation, when the first locking connector bracket interlockingly engages the second locking connector bracket to thereby retain the first and second locking connector brackets in the interlocking engaged position.

5. The system of claim 2, wherein the first locking connector bracket is coupled to an inner side of the coupling strut of the first rack module and extends adjacent an inner side of the coupling strut of the second rack module preventing the first rack module from moving relative to the second rack module in a direction other than along the longitudinal line.

6. The system of claim 2, wherein the second locking connector bracket is coupled to an inner side of the coupling strut of the second rack module and extends adjacent an inner side of the coupling strut of the first rack module preventing the second rack module from moving relative to the first rack module in a direction other than along the longitudinal line.

7. The system of claim 2, wherein the locking pin is slidably connected to a locking pin strut orthogonally connected to the coupling strut of the first rack module.

8. The system of claim 2, wherein the locking pin is slidably connected to the coupling strut of the first rack module.

* * * * *